United States Patent Office 3,366,633
Patented Jan. 30, 1968

3,366,633
MANUFACTURE OF TETRAHYDRO-2-(1H)-PYRIMIDINONE
Myrl Lichtenwalter and Floyd E. Bentley, Austin, Tex., assignors to Jefferson Chemical Company, Inc., Houston, Tex., a corporation of Delaware
No Drawing. Filed Aug. 8, 1966, Ser. No. 570,727
3 Claims. (Cl. 260—251)

This invention is concerned with the manufacture of tetrahydro-2-(1H)-pyrimidinone. More particularly, this invention is concerned with the manufacture of tetrahydro-2-(1H)-pyrimidinone by a one-step process from 1,3-propanediamine and urea.

Tetrahydro-2-(1H)-pyrimidinone, hereinafter referred to as propylene urea, is a valuable intermediate in the preparation of textile finishing agents. For example, propylene urea can be reacted with formaldehyde to yield the dimethylol derivative which is used to treat cellulosic fabrics to give them wash-wear properties.

In United States Patent 3,158,501 there is described a two-step process for the preparation of propylene urea wherein in the first step 1,3-propanediamine and urea are reacted to form an intermediate compound which is neither isolated nor identified but is subjected to a second high temperature step to bring about ring closure to yield propylene urea. The cyclization step is conducted at a temperature above 200° C., preferably around 270° C. The entire process is preferably conducted in the presence of an inert solvent having a boiling point above the temperature at which the second step is conducted. An excess of propanediamine may be used as a solvent in the first step of the reaction; however, it must be removed prior to the high temperature cyclization step.

We have now surprisingly discovered that propylene urea may be obtained in one step from the reaction of 1,3-propanediamine and urea at a temperature of from about 110° C. to about the boiling point of 1,3-propanediamine, using an excess of the diamine as the solvent. In accordance with our process, the molar ratio of propanediamine to urea is at least about 4:1 and is preferably between 5:1 and 6:1. Larger excesses of propanediamine may be used; however, the use of larger excesses is not economically feasible since it reduces the amount of propylene urea that can be prepared in a given piece of equipment and increases the amount of propanediamine that must be recovered.

The entire reaction is conducted at a temperature of from about 110° C. to about the boiling point of 1,3-propanediamine, which is about 135° C. The reaction proceeds more readily at the higher temperature and is preferably run at about 125° C. to 135° C. By maintaining the excess of diamine throughout the reaction, we have found it is unnecessary to heat the reaction mixture to a higher temperature such as that called for in United States Patent 3,158,501 in order to bring about cyclization.

Ammonia is a by-product of the reaction and the course of the reaction may readily be followed by determining the amount of ammonia evolved. At a temperature of from about 125° C. to 135° C. the reaction will normally require about four hours. Longer reaction times are necessary at the lower temperatures.

When the reaction is complete, the reaction mixture is allowed to cool and solid propylene urea precipitates from the solution. The propylene urea may be recovered by any conventional means such as decantation, centrifugation or filtration. The filtrate is unreacted propanediamine and may be recycled to the reaction. To minimize losses of propanediamine and to improve the purity of the propylene urea, the filter cake may be washed with a solvent such as methanol. The propanediamine in the solvent is then recovered by distillation. The yield of propylene urea by our process is in excess of 90%.

Our invention will be further illustrated by the following example.

Example 1

A series of runs was made in a one-liter, three-necked flask equipped with a mechanical stirrer, thermometer and reflux condenser. The charge in each run consisted of 424 grams (5.7 mols) of 1,3-propanediamine and 60 grams (1 mol) of urea. The propanediamine employed in each run consisted of the filtrate from the previous run plus sufficient additional propanediamine to bring the total to 424 grams. In each run the mixture, which formed a homogeneous solution at 30° C., was heated rapidly with stirring. Evolution of ammonia began at around 110° C. to 115° C. and was quite vigorous at 125° C. Refluxing began at around 125° C. and the temperature rose slowly to about 134° C. to 135° C. After four hours from the time the temperature reached 125° C. the weight loss was 34 grams (theory, 34 grams). The reaction mixture was cooled to room temperature and the white needle-like crystals were filtered and sucked as dry as possible. The filtrate was retained for the next cycle. The filter cake was weighed and then washed with two 50 milliliter portions of methanol. The crystalline propylene urea was dried in a vacuum oven at 50° C. and weighed. The results for nine cycles are summarized in Table I. The theoretical yield in each run was 100 g.

TABLE I

| Cycle | Ammonia Evolved (Grams) | Filter Cake, Grams | Filtrate to Recycle, Grams | Propylene Ureak Grams | Melting Point, ° C. |
|---|---|---|---|---|---|
| 1 | 32.5 | 91.5 | 306 | 70 | 254–6 |
| 2 | 33 | 99 | 308 | 78 | 256–8 |
| 3 | 36 | 125 | 282 | 93 | 255–7 |
| 4 | 34 | 105 | 309 | 84 | 255.5–256.5 |
| 5 | 34 | 114 | 316 | 89 | 257–9 |
| 6 | 33 | 115 | 329 | 93 | 256–8 |
| 7 | 34 | 127 | 323 | 96 | 257–8 |
| 8 | 34 | 131 | 319 | 90 | |
| 9 | 34 | 128 | 306 | 96 | 256–7 |

It will be noted that the yield of propylene urea in runs 1 and 2 was substantially below that in later runs. These lower yields may be due to losses in propylene urea because of the solubility of propylene urea in the excess diamine. These losses would not occur in subsequent runs since the recycle diamine would be saturated with propylene urea. The average yield for runs 3 through 9 was 92%. Additional propanediamine may be recovered for recycle by fractional distillation of the methanol wash liquids.

Having thus described our invention, we claim:

1. A method for the preparation of tetrahydro-2-(1H)-pyrimidinone which comprises heating a mixture of 1,3-propanediamine and urea at a temperature within the range of from about 110° C. to about 135° C. until substantially the theoretical amount of ammonia has been evolved, the molar ratio of 1,3-propanediamine to urea in the mixture being at least 4:1.

2. A method as in claim 1 wherein the temperature is within the range of from about 125° C. to 135° C.

3. A method as in claim 2 wherein the molar ratio of 1,3-propanediamine to urea is between 5:1 and 6:1.

References Cited

UNITED STATES PATENTS 3,137,697    6/1964    Boswell et al. _____ 260—251
3,158,501    11/1964    Wayland _____ 260—251

NICHOLAS S. RIZZO, *Primary Examiner.*